US012759624B2

(12) United States Patent
Mahvelatishamsabadi et al.

(10) Patent No.: US 12,759,624 B2
(45) Date of Patent: Oct. 13, 2026

(54) CONTEXT AWARE ADAPTIVE FEEDBACK IN A STEER-BY-WIRE SYSTEM

(71) Applicant: GM GLOBAL TECHNOLOGY OPERATIONS LLC, Detroit, MI (US)

(72) Inventors: Parisa Mahvelatishamsabadi, North york (CA); Ben MacCallum, Toronto (CA); Kin Man Michael Wong, Thornhill (CA); Reza Zarringhalam, Whitby (CA); Puneet Bagga, Etobicoke (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 79 days.

(21) Appl. No.: 18/929,696

(22) Filed: Oct. 29, 2024

(65) Prior Publication Data

US 2026/0116465 A1 Apr. 30, 2026

(51) Int. Cl.
*B62D 6/00* (2006.01)
*B62D 5/00* (2006.01)
*B62D 15/02* (2006.01)

(52) U.S. Cl.
CPC ............ *B62D 6/008* (2013.01); *B62D 5/006* (2013.01); *B62D 15/0265* (2013.01)

(58) Field of Classification Search
CPC ..... B62D 6/008; B62D 5/006; B62D 15/0265
See application file for complete search history.

(56) References Cited

U.S. PATENT DOCUMENTS 11,318,962 B2* 5/2022 Safour .................. B60W 50/16
2002/0035424 A1* 3/2002 Kaufmann ............. B62D 5/001
180/443
2019/0126977 A1* 5/2019 Kim ......................... B62D 6/02
2022/0144308 A1* 5/2022 Takhmar ........... B60W 30/0956
2022/0324512 A1* 10/2022 Heuss ................ B62D 15/0265
2023/0096655 A1* 3/2023 Persson ................ G06V 20/588
701/41
2023/0166789 A1* 6/2023 Chugh ..................... B62D 6/10
701/41
2023/0406406 A1* 12/2023 Zarringhalam ...... B62D 5/0457
(Continued)

FOREIGN PATENT DOCUMENTS

DE 102019218469 B3 4/2021
DE 102021203404 A1 10/2022
(Continued)

*Primary Examiner* — Carl C Staubach
(74) *Attorney, Agent, or Firm* — Ingrassia Fisher & Lorenz, LLP | IFL

(57) ABSTRACT

A haptic vehicle steering feedback system including a sensor for detecting a plurality of objects proximate to a host vehicle and for generating an object map localized on the host vehicle, a vehicle sensor for detecting a vehicle speed and a vehicle lateral acceleration, a rotational torque sensor for detecting a driver applied torque to a steering wheel, an ADAS system for estimating a driver performance in response to the vehicle speed, the vehicle lateral acceleration and the driver applied torque, and for determining an ADAS torque weight factor in response to the object map, an ADAS feature behavior, and the driver performance, a feedback motor for applying a weighted feedback torque to the steering wheel in response to the driver applied torque and the ADAS torque weight factor.

20 Claims, 4 Drawing Sheets

300

(56) References Cited

U.S. PATENT DOCUMENTS

| | | | | |
|---|---|---|---|---|
| 2024/0190459 | A1* | 6/2024 | Mamchuk | B60W 60/001 |
| 2025/0091593 | A1* | 3/2025 | Kasaiezadeh Mahabadi | B60W 50/029 |
| 2025/0313259 | A1* | 10/2025 | Wong | B62D 5/006 |
| 2025/0353489 | A1* | 11/2025 | Zarringhalam | B60W 30/09 |

FOREIGN PATENT DOCUMENTS

| | | | |
|---|---|---|---|
| DE | 102021204360 | A1 | 11/2022 |
| DE | 102020212447 | A1 | 12/2023 |

* cited by examiner

100

CONTEXT AWARE ADAPTIVE FEEDBACK IN A STEER-BY-WIRE SYSTEM

INTRODUCTION

The present disclosure generally relates to steering assist methods, systems, and apparatuses and more particularly relates to methods, systems, and apparatuses providing context-aware steering wheel feedback in steer-by-wire systems based on automated driving decisions and data.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels. These driver assistance systems are dependent on various sensors and communications systems for determining a location of the vehicle within a roadway and for detecting proximate vehicles and other obstacles. To provide effective driver assistance, a vehicle must be capable of sensing its environment and navigating with little or no user input. An autonomous vehicle senses its environment using sensing devices such as radar, LiDAR, image sensors such as cameras, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Recent years have seen significant advancements in autonomous vehicle systems such as, systems and methods that assess driving quality and or safety of the operation of the autonomous vehicle, either by a driver or the vehicle alone, rely on instantaneous and limited information collected from sensors and actuators (e.g., hard brake, sudden acceleration, etc.). Accordingly, it is desirable to provide systems and methods for continuously monitoring vehicle in motion and providing context aware adaptive feedback to a vehicle operator. Furthermore, other desirable features and characteristics of the present disclosure will become apparent from the subsequent detailed description and the appended claims, taken in conjunction with the accompanying drawings and the foregoing technical field and background. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicle control methods and systems and related electrical systems for provisioning vehicle propulsion systems, methods for making and methods for operating such systems, and motor vehicles and other equipment such as aircraft, trucks, buses, forklifts, construction vehicles and other electric vehicles equipped with battery powered electric motors. By way of example, and not limitation, there are presented various embodiments of systems to provide context-aware steering wheel feedback in steer-by-wire systems based on automated driving decisions and data.

In accordance with an aspect of the present disclosure, a haptic vehicle steering feedback system including a sensor for detecting a plurality of objects proximate to a host vehicle and for generating an object map localized on the host vehicle, a vehicle sensor for detecting a vehicle speed and a vehicle lateral acceleration, a rotational torque sensor for detecting a driver applied torque to a steering wheel, an advanced driver assistance system (ADAS) for estimating a driver performance in response to the vehicle speed, the vehicle lateral acceleration and the driver applied torque, and for determining an ADAS torque weight factor in response to the object map, an ADAS feature behavior, and the driver performance, a feedback motor for applying a weighted feedback torque to the steering wheel in response to the driver applied torque and the ADAS torque weight factor.

In accordance with another aspect of the present disclosure, wherein there is an increase in the weighted feedback torque in response to the driver applied torque being applied in a steering direction towards a proximate one of the plurality of objects.

In accordance with another aspect of the present disclosure, wherein there is a reduction in the weighted feedback torque in response to the driver applied torque being applied in a steering direction away from a proximate one of the plurality of objects.

In accordance with another aspect of the present disclosure, wherein the weighted feedback torque is asymmetrical with respect to a steering direction.

In accordance with another aspect of the present disclosure, wherein the ADAS system is further configured to determine a transition rate between an automated driving emulator torque and a manual driving emulator torque in response to the driver performance and the object map and the ADAS feature behavior and wherein the ADAS system is disengaged in response to the driver applied torque exceeding the disengagement threshold.

In accordance with another aspect of the present disclosure, wherein an increase in the weighted feedback torque is indicative of a potential driving hazard.

In accordance with another aspect of the present disclosure, wherein they ADAS torque weight factor is further determined in response to a road friction, a road curvature, and an environmental factor.

In accordance with another aspect of the present disclosure, wherein ADAS system configured to estimate a context aware driving environment in response to the object map, the driver performance, and the vehicle acceleration and wherein the weighted feedback torque is determined in response to the context aware driving environment.

In accordance with another aspect of the present disclosure, wherein the weighted feedback torque is a sum of a driver induced rack motor torque and an ADAS induced rack motor torque.

In accordance with another aspect of the present disclosure, a method of providing a haptic vehicle steering feedback system including detecting, by a sensor suite, a plurality of objects proximate to a host vehicle, generating an object map localized on the host vehicle in response to the plurality of objects proximate to a host vehicle, detecting, by a vehicle sensor, a vehicle speed and a vehicle lateral acceleration, detecting, by a steering system rotational sensor, a driver applied torque to a steering wheel, estimating, by an ADAS processor, a driver performance in response to the vehicle speed, the vehicle lateral acceleration and the driver applied torque, determining, by the ADAS processor, an ADAS torque weight factor in response to the object map, an ADAS feature behavior, and the driver performance, and applying, by a feedback motor, a weighted feedback torque to the steering wheel in response to the driver applied torque and the ADAS torque weight factor.

In accordance with another aspect of the present disclosure, controlling a road wheel angle by a steer by wire steering system in response to the driver applied torque and the ADAS torque weight factor.

In accordance with another aspect of the present disclosure, wherein a feedback torque is applied to the steering wheel and wherein the feedback torque is determined in response to the driver applied torque and the ADAS torque weight factor.

In accordance with another aspect of the present disclosure, wherein the ADAS torque weight factor is further determined to provide an artificial road surface feedback in an absence of a hardware linkage in a steer by wire system.

In accordance with another aspect of the present disclosure, wherein the driver performance is determined in response to a driver attentiveness level, a vehicle operating mode and a driver hands off detection.

In accordance with another aspect of the present disclosure, wherein the driver performance is determined in response to a vehicle trailering mode, a look ahead road curvature and a look ahead visibility distance.

In accordance with another aspect of the present disclosure, wherein the ADAS torque weight factor is further determined in response to a vehicle position tracking error, a heading tracking error and a control availability.

In accordance with another aspect of the present disclosure, wherein the ADAS torque weight factor is inversely proportional to a lateral distance to a proximate object, a relative velocity of the proximate object and a size of the proximate object.

In accordance with another aspect of the present disclosure, wherein the ADAS torque weight factor is determined in response to a front object detection probability, a distance to an oncoming object and a presence of a construction zone.

In accordance with another aspect of the present disclosure, a vehicle control system including a vehicle sensor suite, including at least one of a LiDAR, a radar and a camera, and an inertial measurement unit for detection a vehicle speed, a vehicle acceleration and for generating an object map of a plurality of objects proximate a host vehicle, a rotational torque sensor for detecting a driver applied torque to a steering wheel, a ADAS processor for estimating a driver performance in response to the driver applied torque, the vehicle speed, the vehicle acceleration and the object map, and for determining a driving context in response to the driver performance and the object map and for generating an ADAS torque weight factor in response to the driving context, and a feedback motor for applying a weighted feedback torque to the steering wheel in response to the driver applied torque and the ADAS torque weight factor.

In accordance with another aspect of the present disclosure, wherein the weighted feedback torque is greater for a steering direction towards a proximate one of the plurality of objects and is less for a steering direction away from the proximate one of the plurality of objects.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
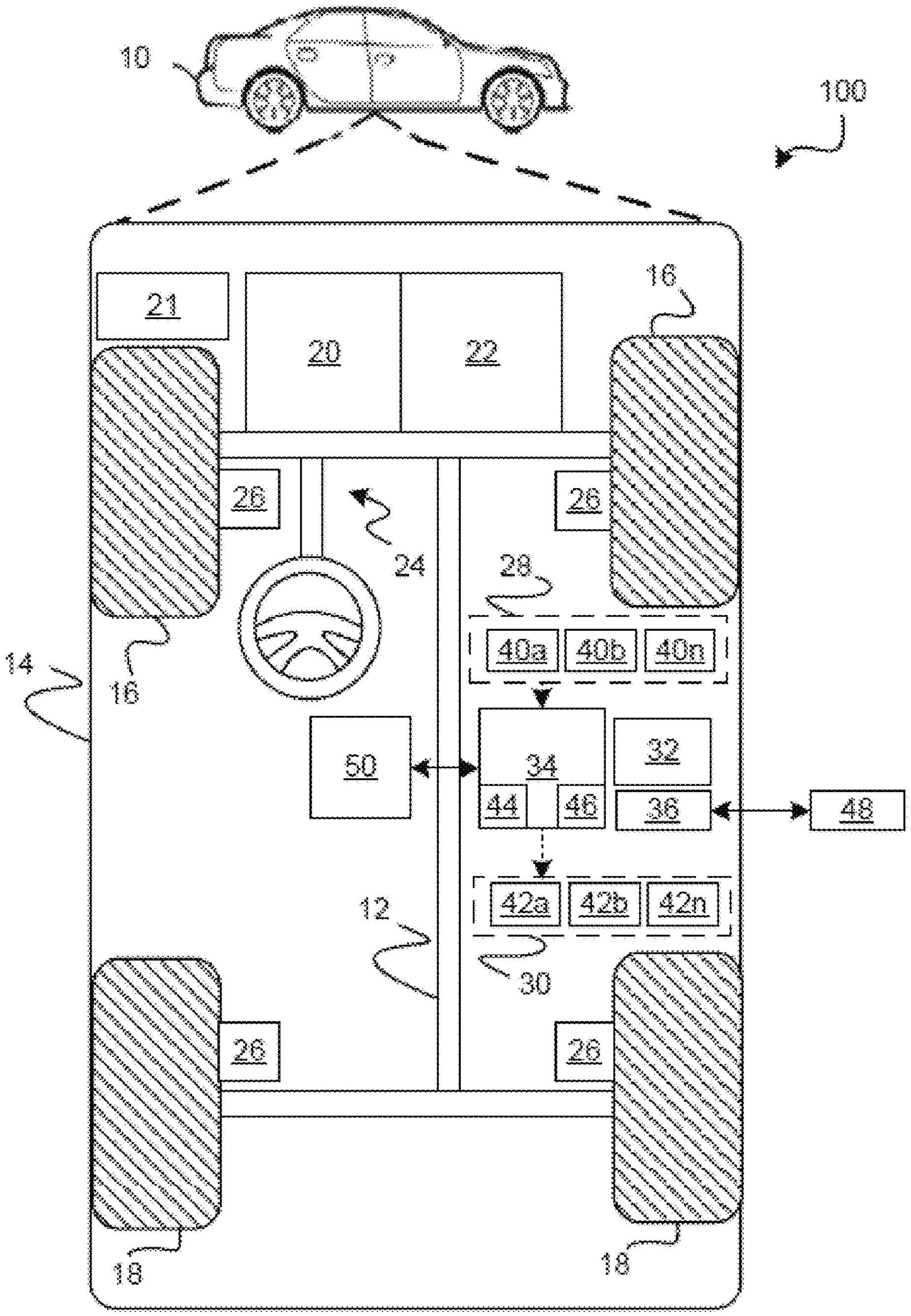
FIG. 1 is illustrative of a vehicle employing one or more electric vehicle motors and battery systems in accordance with various embodiments.

With reference to FIG. 1, a vehicle 10 is shown employing one or more electric vehicle motors and battery systems, and more particularly employs an ADAS controller for performing context-aware steering wheel feedback in steer-by-wire systems based on automated driving decisions and data. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In various embodiments, the vehicle 10 can be an autonomous vehicle that is automatically controlled to carry passengers and/or cargo from one location to another. In an exemplary embodiment, the vehicle 10 can have an automation system of Level Two or higher. A Level Two automation system indicates "partial automation." However, in other embodiments, the autonomous vehicle may be a so-called Level Three, Level Four or Level Five automation system. A Level Three automation system indicates conditional automation. A Level Four system indicates "high automation," referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

However, it is to be understood that the vehicle 10 may also be a conventional vehicle without any autonomous driving functions. The vehicle 10 may implement the functions and methods for generating a virtual view having harmonized color in accordance with the present disclosure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, a fuel cell propulsion system, and/or a combination thereof. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, a manual transmission, or any other appropriate transmission.

The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, LiDAR s, global positioning systems (GPS), optical cameras, thermal cameras, ultrasonic sensors, and/or other sensors. The sensing devices 40*a*-40*n* are further configures to sense observable conditions of the vehicle 10. The sensing devices 40*a*-40*n* can include, but are not limited to, speed sensors, position sensors, inertial measurement sensors, temperature sensors, pressure sensors, etc.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
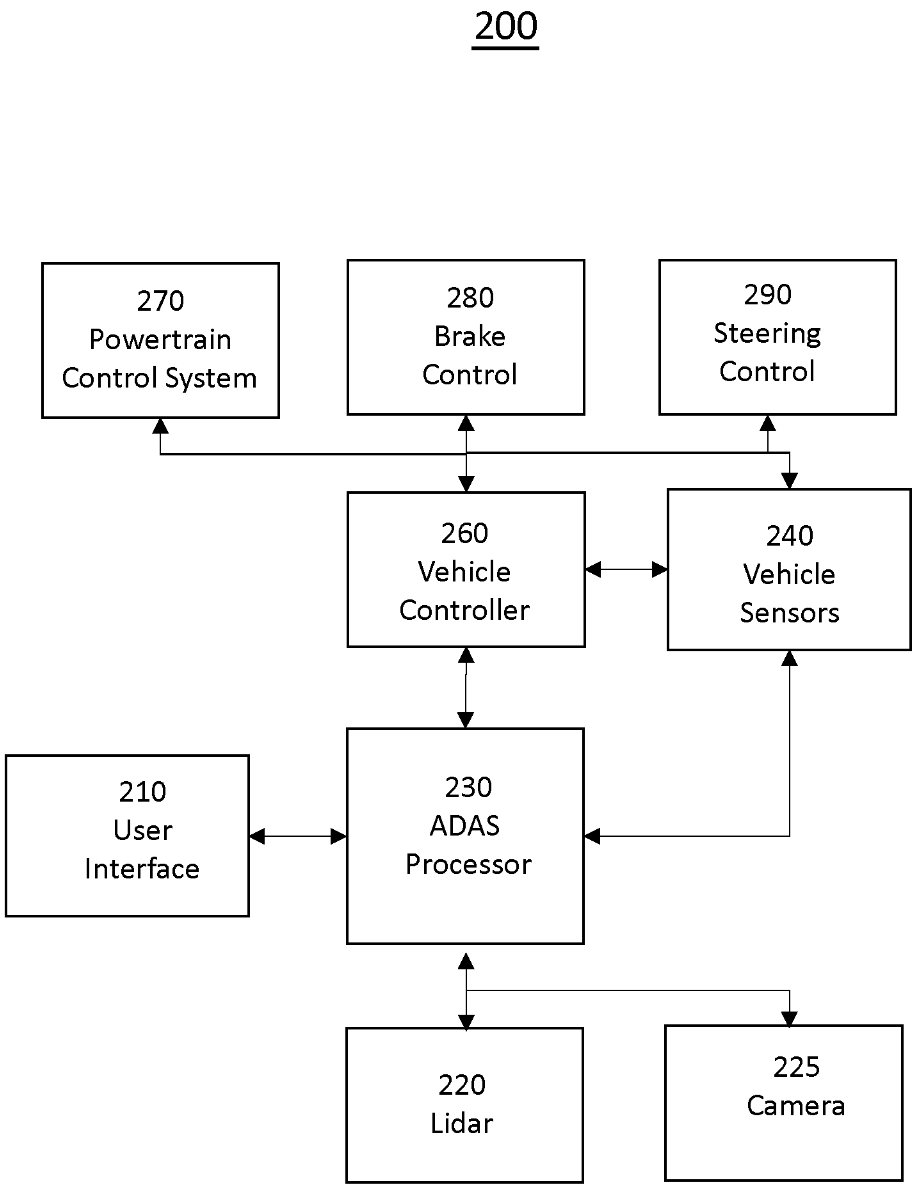
FIG. 2 shows a schematic representation of a vehicle control system for providing context-aware steering wheel feedback in steer-by-wire systems based on automated driving decisions and data according to an exemplary embodiment.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various embodiments, the data storage device 32 stores defined maps of the navigable environment. The defined maps may include a variety of data other than road data associated therewith, including elevation, climate, lighting, etc. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the surround view display system 100 and, when executed by the processor 44, process image data from at least one optical camera of the sensor system 28 to extract features from the images in order to determine the ground plane. The instructions, when executed by the processor 44, use the ground plane to determine camera alignment information. The camera alignment information is then used to assemble the image data to form a surround view from a defined perspective. In various embodiments, the sensing devices 40*a* to 40*n* include N (one or more) cameras that sense an external environment of the vehicle 10 and generate the image data (e.g., optical cameras that are configured to capture color pictures of the environment). The cameras are disposed so that they each cover a certain field of view of the vehicle's surroundings. The image data from each camera is assembled into a surround view based on, for example, the pose and the location of the camera relative to the vehicle and relative to the ground.

It will be appreciated that the controller 34 may otherwise differ from the embodiments depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Turning now to FIG. 2, a schematic representation of a vehicle control system 200 for providing context-aware steering wheel feedback in steer-by-wire systems based on automated driving decisions and data according to an exemplary embodiment is shown. The exemplary system 200 can include a user interface 210, a LiDAR 220, a camera 225, an automated driving assistance system (ADAS) processor 230, a vehicle controller 260, a powertrain control system 270, a brake controller 380 and a steering controller 290. Although the vehicle controller 260 and the ADAS processor 230 are described as discrete units in the following exemplary embodiments, any of the components or functions may be combined into any combination including a single vehicle control processor operative to perform vehicle control algorithms, automated driving control system (ADCS) algorithms, ADAS algorithms, vehicle disablement algorithms and smart vehicle disable algorithms.

The LiDAR 220 is configured to transmit a light pulse at a known angle and elevation and detect the time of propagation of the light pulse. The LiDAR 220 can then determine a distance to an object at the known angle and elevation in response to the time of propagation. The LiDAR 220 can repeat this operation for a plurality of angles and elevations to generate a point cloud of depths to objects within the LiDAR field of view (FOV). Typically, the light pulses are transmitted at regular angle intervals, such as 0.1 degrees and at regular elevation intervals. The larger the number of detection points aggregated in the point cloud, the longer it takes the LiDAR 220 to complete the scan of the LiDAR FOV. A LiDAR point cloud with high density of 3D points requires longer intervals of data capture, but provides higher resolution data with rich features to be utilize in mapping the proximate environment.

In some exemplary embodiments, the LiDAR 220 can be configured to couple the detected depths for each of the angles and elevations as individual points or as a point cloud to the ADAS processor 230 or a LiDAR processor (not shown). The ADAS processor 230 may generate a 3D contour of proximate objects in response to the points and/or point cloud. In addition, the ADAS processor 230 may generate a 3 dimensional representation of the field of view including detection and classification of objects within the field of view.

One or more cameras 225 can be mounted to the host vehicle having a FOV of an area adjacent to the host vehicle, such as a forward FOV, rearward FOV or side FOV. In some exemplary embodiments, images captured by the various cameras 225 can be combined to generate a continuous FOV. The forward view camera 225 may be mounted inside the vehicle behind the rear view mirror or may be mounted on the front fascia of the vehicle. The cameras 310 may use captured images and/or video which can be used to detect preceding and proximate vehicles, obstacles, lane markers, road surface edges, road surface characteristics, other roadway markings and road hazards during ADAS operation. Images captured by the camera 225 and data generated from the images may be used to augment map data stored in a memory. The images captured by the one or more cameras 225 can be coupled to the ADAS processor 230 for object detection. The ADAS processor 230 may run image processing algorithms in response to the image, such as Canny edge detection algorithms for detecting edges within the image as well as RCNN segmentation to detect vehicle contours. These detected edges can then be used to detect object outlines. These object outlines can be used to set boundaries around the detected object as well as to identify and classify the detected objects.

The user interface 210 can include a user input and/or user communications device for communicating information to a driver or autonomous vehicle user. The user interface can include a steering wheel, vehicle pedals, shifters, levers and buttons as a user input. The communications device can include a display, such as a center stack infotainment display, a warning light, an audible notification or alarm, a haptic feedback, or the like. The vehicle controller 260 and ADAS processor 230 can receive user input from the user interface 210, such as ADAS system activation, confirmations or preferences, and can display warnings, operational instructions, or navigational instructions to a user.

In some exemplary embodiments, the vehicle controller 260 can be configured to receive sensor data from vehicle sensors, such as inertial measurement units (IMU) wheel speed sensors, engine temperature sensors and the like, as well as control data such as steering wheel position, throttle position, brake position and the like. In vehicles equipped with ADAS, the vehicle controller 260 may further receive control signals from the ADAS controller indicative of a desired vehicle speed, steering direction, brake application, etc. The vehicle controller 260 is configured to generate control signals to couple to the powertrain control system 270, brake controller 280 and steering controller 290 to control the vehicle movement. The vehicle controller 260 can be configured to monitor vehicle data via the vehicle controller area network (CAN)bus, and/or ADAS algorithm. In response to vehicle data that is outside of normal operational ranges, such as engine temperature, sensor failure, or the like, the vehicle controller 260 can disable a vehicle function, such as propulsion or an ADAS algorithm, or can shut down the vehicle operations completely.

The ADAS processor 230 can be configured to detect the environment around the host vehicle in response to the data received from the LiDAR 220, cameras 225 and vehicle sensors 240. In response to this detection of the environment, the ADAS processor 230 can then determine locations of proximate objects and hazards around the host vehicle and to determine a context of the driving situation. In some exemplary embodiments, the ADAS processor 230 can determine and map to a localized environmental map, road type, lane quality, and look ahead curvature. In response to detected proximate objects, the ADAS processor 230 can determine lateral distance to surrounding vehicles, lateral relative velocity to surrounding vehicles, size of proximate vehicles, road hazard detection and objects in lane detection. The ADAS processor 230 can receive environmental information, such as temperature, humidity and visibility information, vehicle speed, trailer detection and field of view range from the vehicle sensors 240, the LiDAR 220 and the cameras 225. The ADAS processor 230 can then determine an object detection confidence and a context of the driving environment.

In response to the determination of the object detection confidence and the context of the driving environment, the ADAS processor 230 can then provide a context-aware steering wheel feedback can enhance the driver's understanding of their surroundings, enabling them to anticipate and respond to potential hazards. Decoupling of the steering wheel from the rack in steer-by-wire systems provides a unique opportunity to provide such feedbacks, tailored to different driving scenarios. Context aware feedback can include providing tactile steering resistance corresponding to the surround hazards based on ADAS decisions and data, dynamic steering override emulator torque for driver override functionalities, asymmetric steering feel correlated with the optimal driving decisions, dynamic filtration of hand wheel angle based on the road conditions, driving scenario, and active features.

Dynamic steering override emulator torque is a critical component within ADAS that enables drivers to maintain control of their vehicles, even when autonomous steering functions are engaged. The override capability allows drivers to manually steer the vehicle, superseding any automated steering inputs from the ADAS system. In addition, torque simulation can apply artificial torque to the steering wheel to mimic the sensation of traditional driving, indicating to the system that the driver is actively controlling the vehicle. Dynamic adjustment can be provided to adjust the emulator torque in real-time based on factors such as vehicle speed, road conditions, current driving scenarios, surrounding hazards, and driver input, ensuring a smooth, safe, and intuitive transition between autonomous and manual steering. Dynamic steering override emulator torque enhances safety by providing a fail-safe mechanism by allowing drivers to intervene in critical situations or if the ADAS system malfunctions. The improved control enables drivers to maintain vehicle control in challenging driving scenarios, such as avoiding obstacles or navigating complex road conditions and delivers a seamless transition between autonomous and manual steering, making ADAS technology more user-friendly and intuitive.

In some exemplary embodiments, the ADAS processor 230 can provide context aware steering wheel feedback in steer-by-wire systems based on the automated driving decisions and data. The feedback is generated based on the automated driving decisions and data from onboard sensors and control logic. The proposed architecture enables tactile feedback to the driver correlated with ADAS feature behavior, surround object behavior, driving scenario, etc., without impacting the ADAS trajectory tracking accuracy. The ADAS processor 230 can provide natural and safe emulator torque feedback during ADAS override transition and enhance driver awareness and safety by providing asymmetrical steering feel based on driving scenarios and environmental conditions. For example, upon override detection, assessments of driver override aggressiveness, current driving scenario, and lateral dynamics safety limits are utilized to determine the transition rate of emulator torque feedback between ADAS and manual driving. This allows faster transition when the driving environment is safe, or when driver override is aggressive, or when lateral dynamics limit is not reached, and vice versa.

The ADAS processor 230 can perform algorithms for comprehensive and systematic formulation of steering feedback resistance for asymmetric feel adjustment to improve the steering feel by adaptively filtering road noise and adjusting steering stiffness based on the road friction, curvature, driving scenario, enabled ADAS feature, and other environmental or driver-induced factors to enhance driver awareness and safety by providing asymmetrical steering feel based on driving scenarios and environmental conditions. When the driver receives side-dependent levels of feedback through the steering wheel, it allows them to have a better understanding of their surroundings. For example, if the steering wheel provides slightly more resistance on one side, it can indicate potential hazards, prompting the driver to adjust their driving accordingly.

The ADAS processor 230 can further perform algorithms for comprehensive formulation of steering feedback command considering driver, road, front threat, side threat, vehicle, road and control conditions. For each condition, a variety of sub-conditions are considered to compute the steering resistance. The overall asymmetric steering resistance factor can then comprehends all of the conditions in a single stiffness command, to be fed back to the driver through the steer-by-wire emulator. The ADAS processor 230 can further improve the steering feel by adaptively filtering the road noise. The dynamic filter covers both hand-on and hands-off features, and considers road friction, curvature, driving scenario, enabled ADAS feature, and other environmental or driver-induced factors. The result is a situation-aware emulator command that dynamically adjusts the steering feel in manual and automated driving scenarios.

Figure 3:
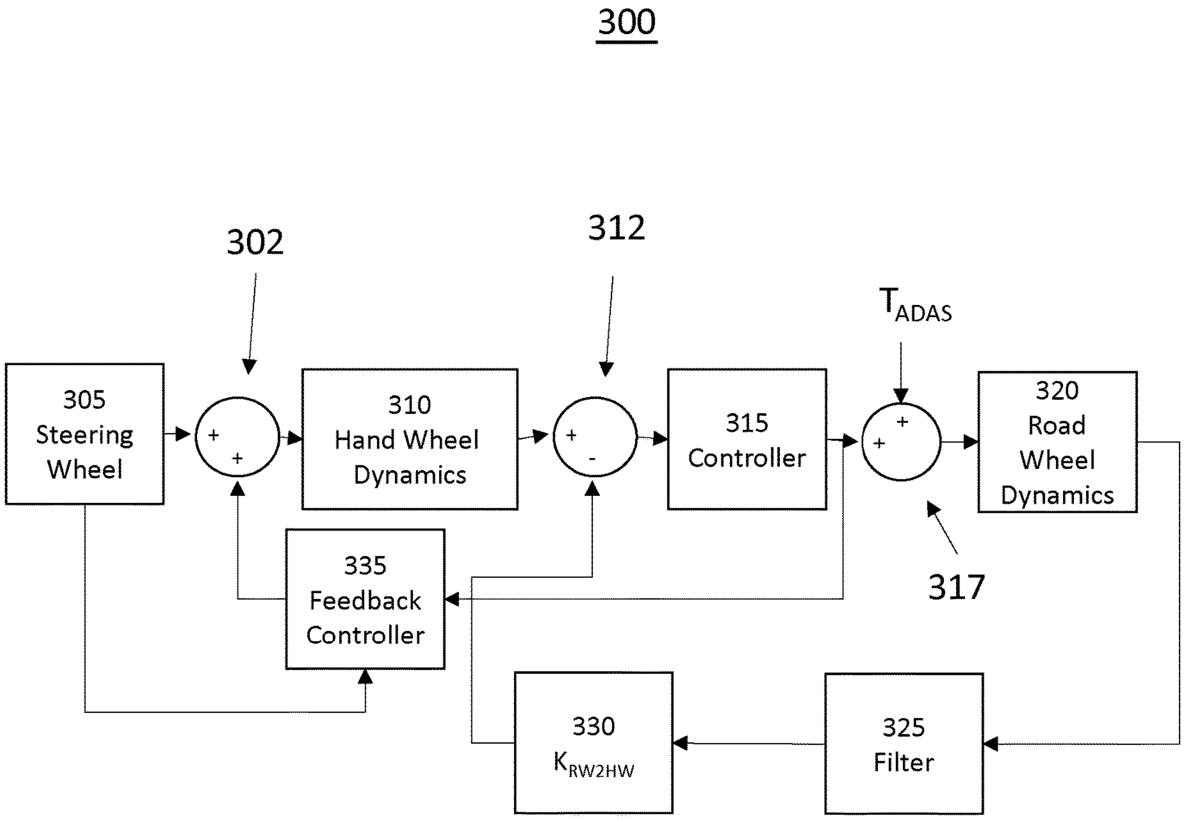
FIG. 3 shows an exemplary architecture for providing context-aware steering wheel feedback in steer-by-wire systems based on automated driving decisions and data according to an exemplary embodiment.

Turning now to FIG. 3, an exemplary architecture 300 for providing context-aware steering wheel feedback in steer-by-wire systems based on automated driving decisions and data according to an exemplary embodiment is shown. The architecture is first configured to receive a driver applied torque in response to a driver rotation of a steering wheel 305. In some exemplary embodiments, the driver applied torque can be determined by a torque sensor that directly measures the rotational force applied to a shaft or the steering wheel 305. In the context of steering, a torque sensor can be installed either on the steering column or the steering wheel 305 itself. The driver applied torque is coupled to a feedback controller 335 for use in generating a feedback motor torque. The feedback motor torque value and the driver applied torque value are combined 302 to generate a total applied torque on the steering wheel system.

The hand wheel angle is next determined as a function of the hand wheel dynamics 310 in response to the total applied torque. The hand wheel dynamics 310 can include steering gear ratio, steering column stiffness: steering wheel size and shape, and power steering assistance. The road wheel to hand wheel angle ratio 330 is then subtracted 312 from the hand wheel angle with the difference being applied to a rack motor controller 315. The rack motor controller 315 outputs a driver induced rack torque which is applied back to the feedback controller 335. The driver induced rack torque is also combined 317 with the ADAS induced rack motor torque ($T_{ADAS}$) to generate the total rack motor torque. The road wheel angle is then determined from the total rack motor torque as a function of the road wheel dynamics 320. This total rack motor torque is filtered 325 with a road noise filter time constant and is applied to the road wheel to generate the hand wheel angle ratio 330. In some exemplary embodiments, situational driving context can be used to adjust the hand wheel angle ratio 330 in order to change the driver feel and steering performance.

In some exemplary embodiments, the ADAS induced rack motor torque ($T_{ADAS}$) can be generated in response to a situational driving context. For example, the ADAS induced rack motor torque can be increased in a direction in response to road time, lane quality, and look ahead curvature. For example, if the left lane next to the current vehicle lane is an oncoming lane, the left rotational ADAS induced rack motor torque ($T_{ADAS}$) can be increased and be greater than the right rotational ADAS induced rack motor torque ($T_{ADAS}$). Likewise, the ADAS induced rack motor torque ($T_{ADAS}$) can be weighted inversely proportional to a lateral distance between a host vehicle and a proximate vehicle in the rotational direction. Based on the current driving context, as determined by the ADAS system, the right and/or left rotational ADAS induced rack motor torque ($T_{ADAS}$) weight can be increased or decreased. In some exemplary embodiments, the torque provided by the Feedback Controller 335 can be adjusted based on driving situations, such as curvature, lane quality, and presence of threats. As a result, the driver feels more resistance to inducing vehicle motion toward situations which present a potential hazard. T_ADAS is the nominal torque provided by an ADAS feature for the purpose of an active safety feature such as lane centering/keeping and can be separate from the driver feel adjustment.

Figure 4:
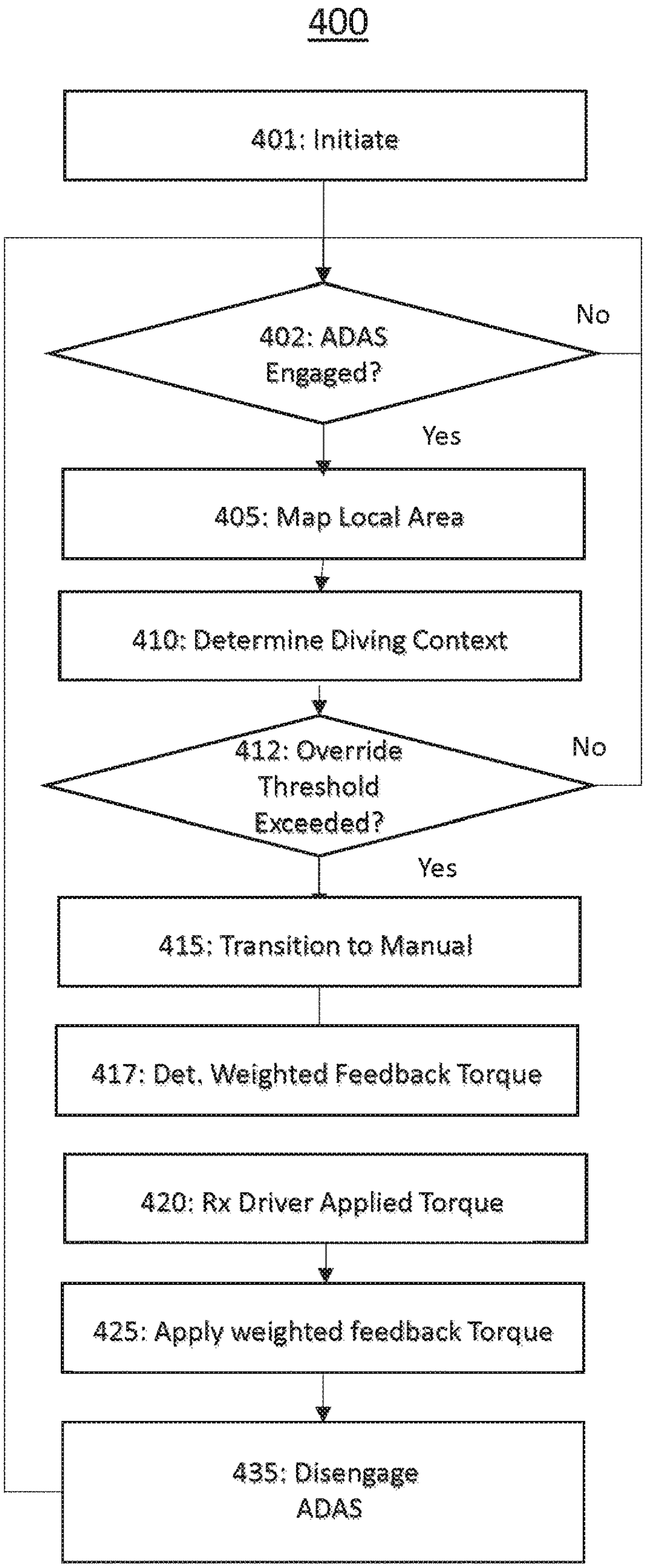
FIG. 4 shows a flow chart descriptive of a method for providing context-aware steering wheel feedback in steer-by-wire systems based on automated driving decisions and data according to an exemplary embodiment.

Turning now to FIG. 4, a method 400 for providing context-aware steering wheel feedback in steer-by-wire systems based on automated driving decisions and data according to an exemplary embodiment is shown. The exemplary method 400 is first initiated 401 in response to a user input, a ADAS processor activation or the like. For example, the method 400 may be initiated when the vehicle run state is transitioned from a standby state to an on state. In response to the initiation 401, the method 400 next determines if the ADAS system has been engaged 402. If the ADAS system has not been engaged, the method 400 returns to determining if the ADAS system has been engaged 402. In some exemplary embodiments, a time delay can be performed between a determination that the ADAS system has not been engaged 402 and a subsequent determination.

If the ADAS system is engaged 402, the method 400 next maps 405 the area local to the proximate vehicle. The area can be mapped in response to data stored in a memory, such as map data, data received from sensor such as LiDAR, radar, cameras and the like, and/or can be mapped in response to vehicle sensor data, such as GPS sensors, vehicle speed sensors, IMUs and the like.

In response to mapping the local area, the method 400 next determines 410 a driving context for the host vehicle. In response to the received sensor data, the method 400 can use semantic segmentation to categorize different elements within the scene, such as sky, road, and obstacles. This creates a detailed map that facilitates navigation and decision-making. The method 400 can then track the movement of objects over time to allow the vehicle to predict their future trajectories and potential interactions, enabling proactive avoidance maneuvers. By analyzing the behavior of other vehicles, including their speed and direction, the autonomous vehicle control system gains insights into the overall traffic dynamics and can make informed decisions regarding lane changes or yielding. Leveraging knowledge of road rules, traffic signs, and historical data, the vehicle control system can interpret the driving situation and make appropriate decisions, such as yielding or changing lanes, ensuring safe and efficient operation to determine a situationally aware driving context 410.

In response to the determined driving context 410, the method 400 next determines an override threshold 415 required for a driver to disengage the ADAS system. In some exemplary embodiments, as the context of the driving situation changes, the override threshold can increase or decrease. For example, upon override detection, assessments of driver override aggressiveness, current driving scenario, and lateral dynamics safety limits are utilized to determine the transition rate of emulator torque feedback between ADAS and manual driving. This allows faster transition when the driving environment is safe, or when driver override is aggressive, or when lateral dynamics limit is not reached, and vice versa.

The method 400 is next operative to determine 417 a weighted feedback torque to apply to the steering system in response to the driving context. The feedback torque can be generated based on automated driving decisions of the ADAS controller and data from onboard sensors and control logic. In some exemplary embodiments, a tactile feedback can be applied to the steering system correlated with ADAS feature behavior, surrounding object behavior, driving scenario, etc., without impacting the ADAS trajectory tracking accuracy. To enhance driver awareness and safety, the weighted feedback torque can be applied asymmetrically in order to convey critical information regarding driving scenarios and environmental conditions to a vehicle operator. By strategically varying the steering resistance side-to-side, the driver receives cues that alert them to potential hazards or changes in the driving environment. The method 400 can formulate the steering feedback weight by considering a wide range of factors, including driver input, road conditions, front and side threats, vehicle dynamics, and control system parameters. For each factor, multiple sub-conditions are evaluated to determine the appropriate level of steering resistance. The overall asymmetrical steering resistance factor is then calculated by integrating the contributions from all factors and is applied to the steer-by-wire emulator to provide the driver with the desired steering feel. In some exemplary embodiments, weighted feedback torque can be determined in response to data provided from the feedback Controller 335, hand wheel ratio 330, and filter 325 as previously described with reference to FIG. 3, as the mechanisms through which the feedback torque and overall steering resistance and asymmetric feel are achieved.

The method 400 next receives 420 a driver applied torque value as determined by a torque sensor on the steering wheel or steering column shaft. A feedback to the driver is then applied by a feedback motor equal to the driver applied torque weighted with the feedback torque. This feedback to the steering wheel alerts the driver to potential hazards or changes in the driving environment.

The method 400 next determines if 430 the driver applied torque exceeds the override torque threshold. If the override torque threshold has not been exceeded, the method 400 returns to determine if 402 the ADAS is still engaged. If 430 the override torque threshold has been exceeded, the ADAS is disengaged 435 and the method 400 returns to determining if the ADAS is reengaged 402.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A haptic vehicle steering feedback system comprising:

a sensor for detecting a plurality of objects proximate to a host vehicle and for generating an object map localized on the host vehicle;

a vehicle sensor for detecting a vehicle speed and a vehicle lateral acceleration;

a rotational torque sensor for detecting a driver applied torque to a steering wheel;

an automated driving assistance system (ADAS) system for estimating a driver performance in response to the vehicle speed, the vehicle lateral acceleration and the driver applied torque, and for determining an ADAS torque weight factor in response to the object map, an ADAS feature behavior, and the driver performance wherein the ADAS system is further configured to determine a transition rate between an automated driving emulator torque and a manual driving emulator torque in response to the driver performance and the object map and the ADAS feature behavior and wherein the ADAS system is disengaged in response to the driver applied torque exceeding a disengagement threshold;

a feedback motor for applying a weighted feedback torque to the steering wheel in response to the driver applied torque and the ADAS torque weight wherein the weighted feedback torque is asymmetrically applied to provide an increased resistance for steering inputs from a driver directed toward a detected object in the object map and decreased resistance for steering inputs from the driver directed away from the detected object to provide situational awareness to the driver.

2. The haptic vehicle steering feedback system of claim 1, wherein there is an increase in the weighted feedback torque in response to the driver applied torque being applied in a steering direction towards a proximate one of the plurality of objects.

3. The haptic vehicle steering feedback system of claim 1, wherein there is a reduction in the weighted feedback torque in response to the driver applied torque being applied in a steering direction away from a proximate one of the plurality of objects.

4. The haptic vehicle steering feedback system of claim 1, wherein the weighted feedback torque is asymmetrical with respect to a steering direction.

5. The haptic vehicle steering feedback system of claim 1, wherein the ADAS torque weight factor is further determined to provide an artificial road surface feedback in an absence of a hardware linkage in a steer by wire system.

6. The haptic vehicle steering feedback system of claim 1, wherein an increase in the weighted feedback torque is indicative of a potential driving hazard.

7. The haptic vehicle steering feedback system of claim 1, wherein the ADAS torque weight factor is further determined in response to a road friction, a road curvature, and an environmental factor.

8. The haptic vehicle steering feedback system of claim 1, wherein ADAS system configured to estimate a driving context in response to the object map, the driver performance, and the vehicle acceleration and wherein the weighted feedback torque is determined in response to the driving context.

9. The haptic vehicle steering feedback system of claim 1, wherein the weighted feedback torque is weighted inversely proportional to a lateral distance between a host vehicle and a proximate vehicle in a steering direction.

10. A method of providing a haptic vehicle steering feedback system comprising:

detecting, by a sensor suite, a plurality of objects proximate to a host vehicle;

generating an object map localized on the host vehicle in response to the plurality of objects proximate to a host vehicle;

detecting, by a vehicle sensor, a vehicle speed and a vehicle lateral acceleration;

detecting, by a steering system rotational sensor, a driver applied torque to a steering wheel;

estimating, by an automated driving assistance system (ADAS) processor, a driver performance in response to the vehicle speed, the vehicle lateral acceleration and the driver applied torque;

determining, by the ADAS processor, an ADAS torque weight factor in response to the object map, an ADAS feature behavior, and the driver performance;

applying, by a feedback motor, a weighted feedback torque to the steering wheel in response to the driver applied torque and the ADAS torque weight factor wherein the weighted feedback torque is asymmetrically applied to provide an increased resistance for steering inputs from a driver directed toward a detected object in the object map and decreased resistance for steering inputs from the driver directed away from the detected object to provide situational awareness to the driver;

determining, by the ADAS processor, a transition rate between an automated driving emulator torque and a manual driving emulator torque in response to the driver performance and the object map and the ADAS feature behavior; and disengaging, by the ADAS processor, an ADAS algorithm in response to the driver applied torque exceeding a disengagement threshold.

11. The method of providing the haptic vehicle steering feedback system of claim 10, further including controlling a road wheel angle by a steer by wire steering system in response to the driver applied torque and the ADAS torque weight factor.

12. The method of providing the haptic vehicle steering feedback system of claim 10, wherein the weighted feedback torque is weighted inversely proportional to a lateral distance between a host vehicle and a proximate vehicle in a steering direction.

13. The method of providing the haptic vehicle steering feedback system of claim 10, wherein the ADAS torque weight factor is further determined to provide an artificial road surface feedback in an absence of a hardware linkage in a steer by wire system.

14. The method of providing the haptic vehicle steering feedback system of claim 10, wherein the driver performance is determined in response to a driver attentiveness level, a vehicle operating mode and a driver hands off detection.

15. The method of providing the haptic vehicle steering feedback system of claim 10, wherein the driver performance is determined in response to a vehicle trailering mode, a look ahead road curvature and a look ahead visibility distance.

16. The method of providing the haptic vehicle steering feedback system of claim 10, wherein the ADAS torque weight factor is further determined in response to a vehicle position tracking error, a heading tracking error and a control availability.

17. The method of providing the haptic vehicle steering feedback system of claim 10, wherein the ADAS torque weight factor is inversely proportional to a lateral distance to a proximate object, a relative velocity of the proximate object and a size of the proximate object.

18. The method of providing the haptic vehicle steering feedback system of claim 10, wherein the ADAS torque weight factor is determined in response to a front object detection probability, a distance to an oncoming object and a presence of a construction zone.

19. A vehicle control system comprising:

a vehicle sensor suite, including at least one of a LiDAR, a radar and a camera, and an inertial measurement unit for detection a vehicle speed, a vehicle acceleration and for generating an object map of a plurality of objects proximate a host vehicle;

a rotational torque sensor for detecting a driver applied torque to a steering wheel;

an automated driving assistance system (ADAS) processor for estimating a driver performance in response to the driver applied torque, the vehicle speed, the vehicle acceleration and the object map, and for determining a driving context in response to the driver performance and the object map and for generating an ADAS torque weight factor in response to the driving context, wherein the ADAS system is further configured to determine a transition rate between an automated driving emulator torque and a manual driving emulator torque in response to the driver performance and the object map and the ADAS feature behavior and wherein the ADAS system is disengaged in response to the driver applied torque exceeding a disengagement threshold;

a feedback motor for applying a weighted feedback torque to the steering wheel in response to the driver applied torque and the ADAS torque weight factor wherein the weighted feedback torque is asymmetrically applied to provide an increased resistance for steering inputs from a driver directed toward a detected object in the object map and decreased resistance for steering inputs from the driver directed away from the detected object to provide situational awareness to the driver.

20. The vehicle control system of claim 19, wherein the weighted feedback torque is greater for a steering direction towards a proximate one of the plurality of objects and is less for a steering direction away from the proximate one of the plurality of objects.

* * * * *